United States Patent [19]

Stefik et al.

[11] Patent Number: 5,724,064

[45] Date of Patent: Mar. 3, 1998

[54] COMPUTING SYSTEM WITH AN INTERACTIVE DISPLAY

[75] Inventors: Mark J. Stefik, Woodside; David M. Levy, Palo Alto; Michalene M. Casey, Morgan Hill, all of Calif.

[73] Assignee: Xerox Corporation, Stamford, Conn.

[21] Appl. No.: 579,515

[22] Filed: Dec. 27, 1995

[51] Int. Cl.⁶ .................................................. G09G 3/38
[52] U.S. Cl. .......................... 345/105; 345/84; 345/85; 345/107
[58] Field of Search ............................ 345/173, 107, 345/105, 106, 85, 84

[56] References Cited

U.S. PATENT DOCUMENTS

| | | | |
|---|---|---|---|
| 4,126,854 | 11/1978 | Sheridon. | |
| 4,725,694 | 2/1988 | Auer et al. | 345/173 |
| 4,734,789 | 3/1988 | Smith et al. | 345/173 |
| 4,742,345 | 5/1988 | Di Santo et al. | 345/107 |
| 4,827,410 | 5/1989 | Corren | 345/173 |
| 4,833,279 | 5/1989 | Chen et al. | 345/173 |
| 4,855,725 | 8/1989 | Fernandez | 345/173 |
| 5,233,502 | 8/1993 | Beatty et al. | 345/173 |
| 5,389,945 | 2/1995 | Sheridon | 345/85 |
| 5,411,656 | 5/1995 | Schubert | 345/107 |
| 5,412,398 | 5/1995 | DiSanto et al. | 345/107 |
| 5,448,044 | 9/1995 | Price et al. | 345/173 |
| 5,508,720 | 4/1996 | DiSanto et al. | 345/107 |
| 5,604,517 | 2/1997 | Filo | 345/173 |

*Primary Examiner*—Richard Hjerpe
*Assistant Examiner*—Juliana S. Kim
*Attorney, Agent, or Firm*—Fariba Rad

[57] ABSTRACT

An interactive display is disclosed which comprises a housing to receive an induced field activated display sheet which has a plurality of image producing elements responsive to an induced field. The housing has a transparent cover panel and a base panel. The cover panel and the base panel of the display housing comprise a plurality of means for creating a plurality of induced fields for selectively activating the image producing elements of the induced field activated display sheet. By selectively activating the induced field means, selective image producing elements of the induced field activated display sheet will be activated to produce a desired image on the induced field activated display sheet thereby creating a display. If desired the induced field activated display sheet can be removed from the display housing to be used as a printed document.

11 Claims, 5 Drawing Sheets

COMPUTING SYSTEM WITH AN INTERACTIVE DISPLAY

BACKGROUND OF THE INVENTION

This invention relates to an interactive display and more particularly to a display used in conjunction with a computing system in which a removable induced field activated display sheet is used in a display housing to display different images sent by the processor of the computing system.

Referring to FIG. 1, there is shown a prior art display 10 which is connected to a computing system 12. A processor (not shown) within the computing system 12 sends an image to the display 10 to be presented to the operator of the computing system. Once an image is presented on the display, the operator is not capable of walking away from the computing system sight with the displayed information. In other words, the operator can not carry the displayed image.

Typically, in order to carry the displayed information, the operator has to print the displayed information on a paper which requires the computing system to be connected to a printer. This creates a portability problem for the users of computing systems such as laptop systems.

For the purpose of transportation, the laptop systems are designed with a minimum size and weight. However, if the traveling operator requires a print out from the image displayed on the display of the computing system, a printer which is a separate piece of equipment than the laptop system is also needed. Carrying a separate printer adds to the weight and the size of the package that the traveling operator has to carry. Furthermore, operating a laptop system in a limited space such as a passenger seat on an air plane places a restriction on the amount of equipment.

It is an object of this innovation to provide a display in which an operator can remove the displayed information from the display screen and walk away with the displayed information.

SUMMARY OF THE INVENTION

In accordance with the present invention, an interactive display is disclosed which comprises a housing to receive a removable induced field activated display sheet which has a plurality of image producing elements responsive to an induced field. The display housing has a transparent cover panel and a base panel. The cover panel and the base panel of the display housing comprise means for creating a plurality of induced fields for selectively activating the image producing elements of the induced field activated display sheet. A processor which is connected to the display housing controls the selective activation of the induced field creating means. By selectively activating the induced field creating means, selective image producing elements of the induced field activated display sheet will be activated to produce a desired image or text on the induced field activated display sheet, thereby creating a display. If desired, the induced field activated display sheet can be removed from the display housing to be used as a printed document.

DETAILED DESCRIPTION OF THE INVENTION

Figure 1:
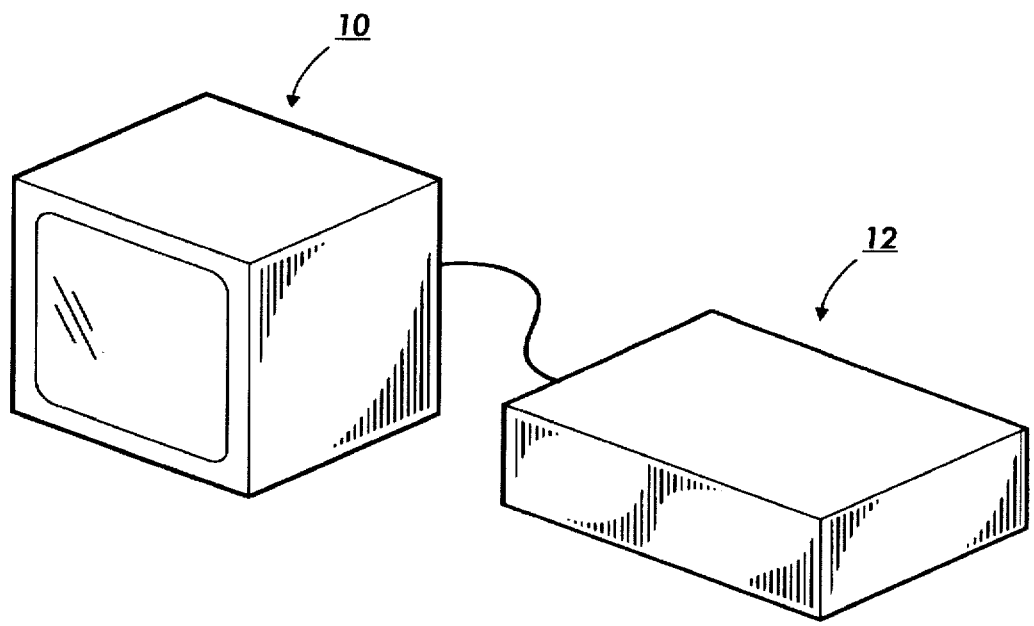
FIG. 1 shows a prior art display which is connected to a computing system.
Figure 2:
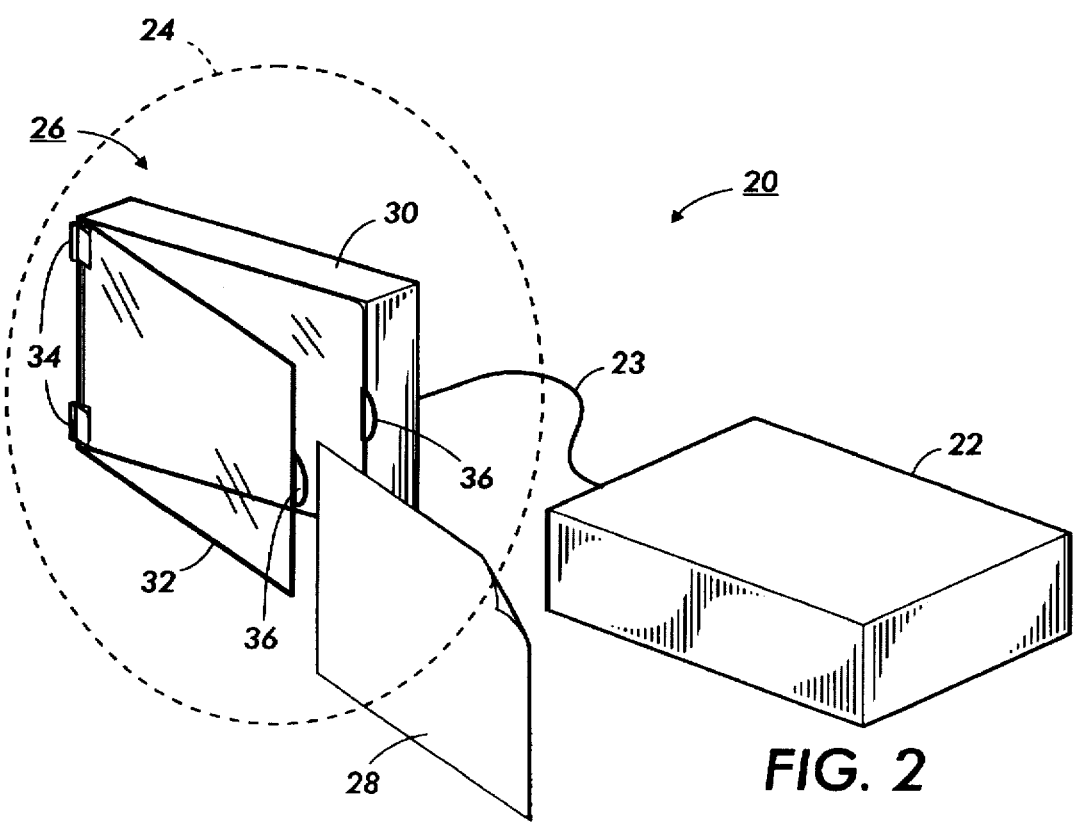
FIG. 2 shows a computing system which is connected to a display of this invention.

Referring to FIG. 2, there is shown a computing system 20 which comprises a processor (not shown) within a housing 22 and a display 24 of this invention. The display 24 of this invention comprises a display housing 26 which is built to receive a removable induced field activated display sheet 28. The display housing 26 is connected to the processor of the computing system via cable 23.

The display housing 26 comprises a base panel 30, a transparent cover panel 32, a hinge 34 and a lock 36. Hinge 34 connects the cover panel 32 to the base panel 30 in such a manner that the cover panel 32 can be opened like a cover of a book. Lock 36 which can be a stand alone lock such as the lock shown in FIG. 2, it can also be built into the hinge 34. In the preferred embodiment of this invention, lock 36 is built into the hinge 34. However, for the purpose of clarity in FIG. 2, lock 36 is shown as a stand alone lock.

Once the cover panel 32 is closed to a locked position, lock 36 causes the cover panel 32 to stay at a fixed position with respect to the base panel 30 until the operator of the computing system unlocks the lock 36.

Figure 3:
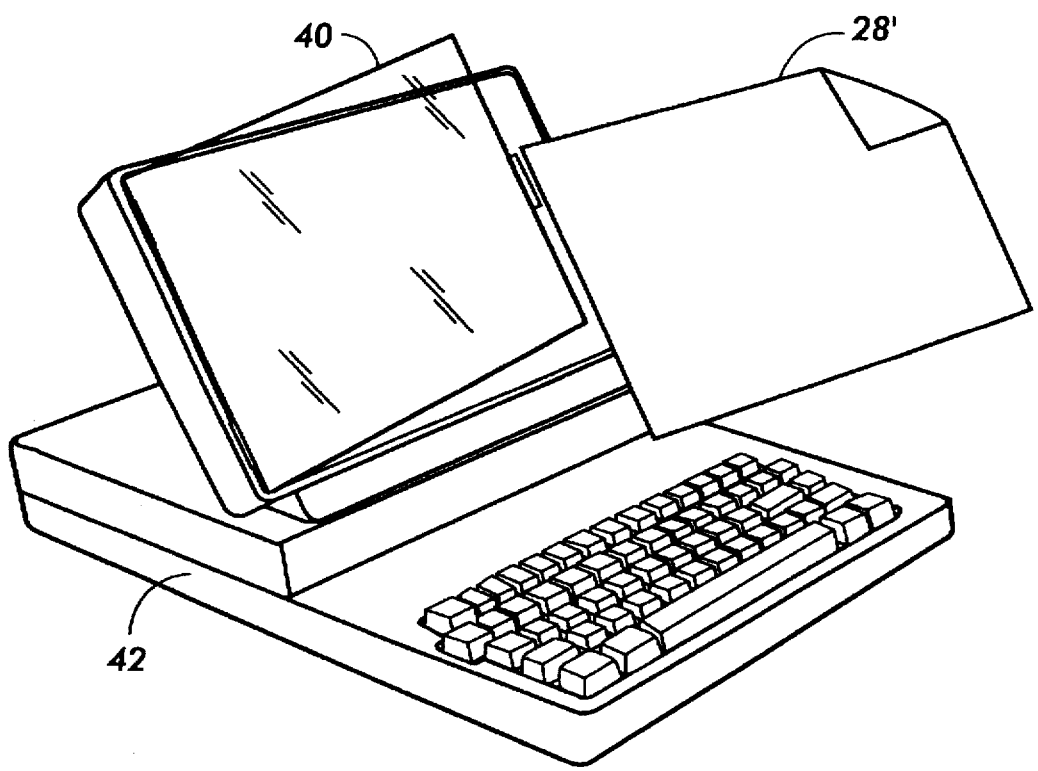
FIG. 3 shows a display of this invention which is connected to a laptop computing system.

The display housing 24 can be made to be detached from the housing of the computing system such as the display of a personal computing system as shown in FIG. 2 or it can be attached to a computing system such as a laptop system as shown in FIG. 3. In FIG. 3, the display housing 40, which is identical to display housing 24 of FIG. 2, is attached to the housing 42 of a laptop computing system.

However, regardless of whether the display screen is attached or detached, the display housing receives a removable induced field activated display sheet which will display the images sent by the processor of the computing system. For the purpose of simplicity, hereinafter "the induced field activated display sheet" will be referred to as "the display sheet".

A display sheet comprises a thin transparent sheet which has many attributes of a paper document. It looks like paper, has ambient light valve behavior like paper (for example, the brighter the ambient light, the more easily it may be seen), is flexible like paper, can be carried around like paper, can be copied like paper, and has nearly the archival memory of paper.

A display sheet has a plurality of image producing elements each of which is responsive to an induced field such as an electric field or a magnetic field. At the presence of an induced field, each image producing element, which is located within the perimeter of the induced field, displays a dot in a color other than the background color of the display sheet. This provides an opportunity to selectively produce dots which their combination presents a desired image.

Upon removal of the induced fields, the displayed dots remain on the display sheet. However, if a reverse induced field or in some display sheets a different force is applied to an image producing element which has created a dot, the dot will disappear.

It should be noted that a display sheet can be a color display sheet or a black and white display sheet to generate color images or black and white images respectively. However, for the purpose of simplicity, the following example describes a black and white display sheet.

Figure 4:
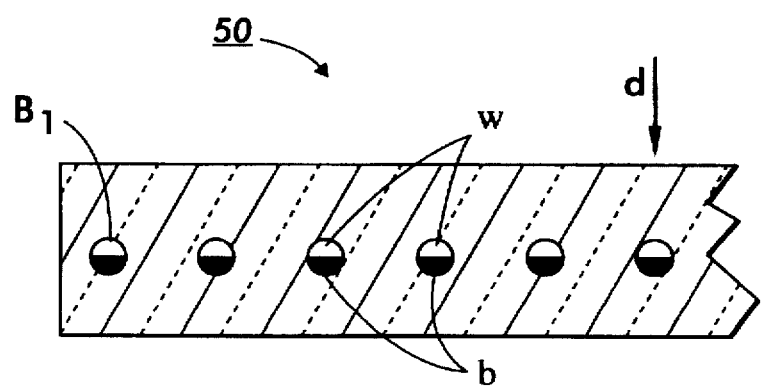
FIG. 4 shows a cross sectional view of a portion of a display sheet which comprises a plurality of spherical particles which have a white hemisphere on one side and a black hemisphere on the other side.

For example, referring to FIG. 4, there is shown a cross sectional view of a portion of a display sheet 50 which comprises a plurality of spherical particles B (image producing elements) which have a black hemisphere on one side and a black hemisphere on the other side. Such a display is disclosed in the U.S. Pat. No. 4,126,854 titled "Twisting Ball Panel Display". In the display sheet 50 which is used for a black and white display, each spherical particle B has a black hemisphere b and a white hemisphere w. In FIG. 4, looking at the display sheet 50 from the top in the direction shown as d, since only the white hemispheres w of all the spherical particles B are visible, the display sheet is seen as a blank display sheet (assuming that the background of the display sheet is white).

Figure 5:
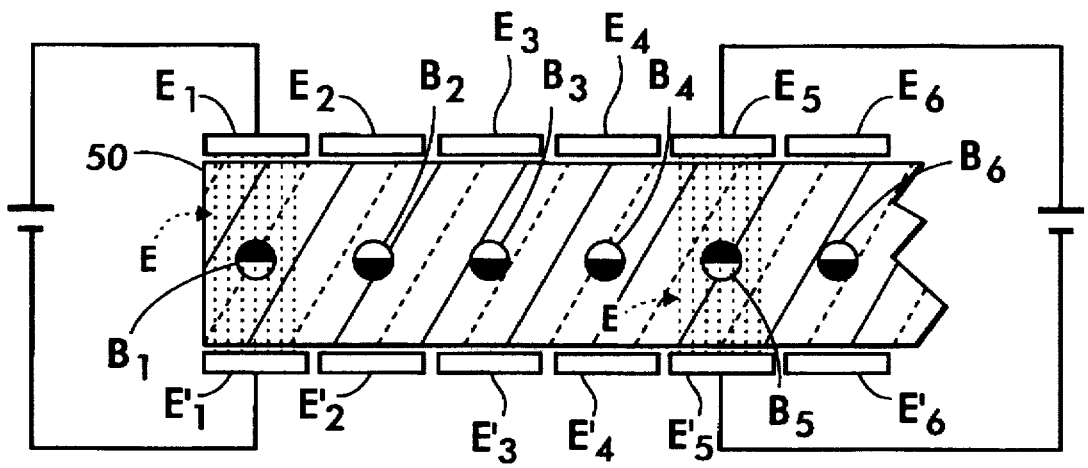
FIG. 5 shows a plurality of electrodes which are placed over and under a display sheet to selectively provide plurality of electric fields in order to selectively twist the spherical particles of the display sheet to selectively show the white hemispheres or the black hemispheres of spherical particles.

Referring to FIG. 5, in order to twist the spherical particles of a display sheet to selectively show the white hemispheres w or the black hemispheres b, a plurality of electric fields E (induced fields) are used. Each electric field E is generated by a pair of electrodes such as $E_1$ and $E_1'$ each of which has to be placed at one side of the display sheet 50 at mirror image positions with respect to the display sheet 50. In FIG. 5, each pair of electrodes ($E_1$ and $E_1'$), ($E_2$ and $E_2'$), ($E_3$ and $E_3'$), ($E_4$ and $E_4'$), ($E_5$ and $E_5'$) and ($E_6$ and $E_6'$) is placed across a spherical particle $B_1$, $B_2$, $B_3$, $B_4$, $B_5$ and $B_6$ respectively.

With this arrangement once each pair of electrodes is connected to an electric potential, they will create an electric field across the display sheet such as the electric fields E generated by the electrodes $E_1$, $E_1'$, E and 5, and E and 5'. It should be noted that each pair of electrodes is individually addressable.

Depending on the direction of the electric field applied to each spherical particle, one of the hemispheres will be displayed. In FIG. 5, only the electrodes ($E_1$ and $E_1'$) and (E and, 5 and E and 5') are connected to electric potentials and therefore, only the spherical particles $B_1$ and $B_5$ which are located within the electric fields E have twisted in such a manner that their black hemispheres b are visible from the top of the sheet. By applying a reverse potential to the electrodes ($E_1$ and $E_1'$) and (E and 5, and E and 5') the spherical particles $B_1$ and $B_5$ will switch to have their white hemispheres visible. The voltage required to generate the electric field adequate to switch the white hemispheres to black hemispheres or visa versa is called switching voltage.

It should be noted that an electric field created by a voltage less than switching voltage can partially rotate the balls in such a manner that both black and white hemispheres are visible, which is useful in creating Gray scale.

Once a spherical particle twists to have its black hemisphere visible, a black dot on the display sheet is generated. The black and white hemispheres of the spherical particles can be selectively twisted to display a desired image or text. Upon removal of the electric fields, the spherical particles stay stationary which cause the image to remain on the display sheet.

It should be noted that FIGS. 4 and 5 show only one type of display sheet. However, there are different kinds of display sheets which utilize different induced fields to operate. Depending on the design of the display sheet, the induced field may need to be applied differently.

In the preferred embodiment of this invention, electric fields are used as the induced fields and they are applied across the display sheet.

Figure 6:
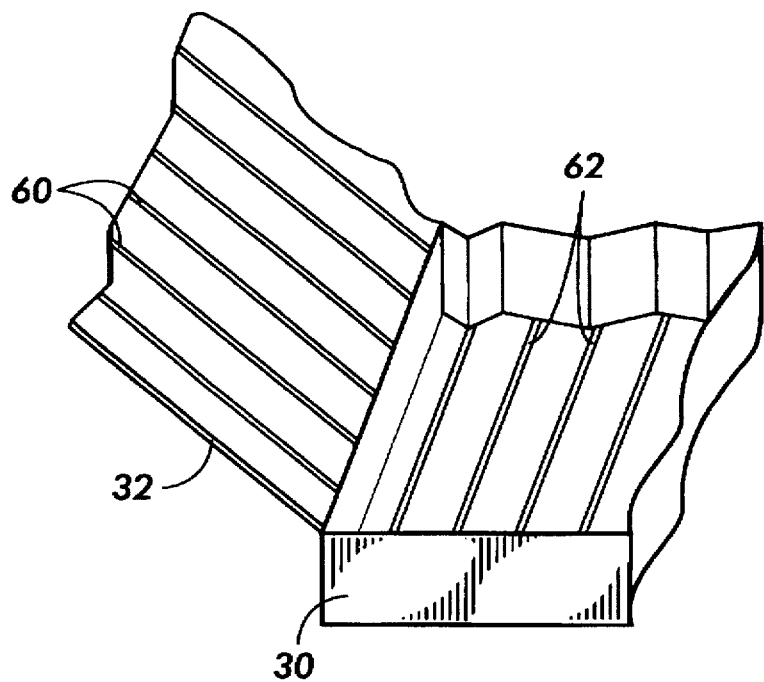
FIG. 6 shows a magnified portion of both the cover panel and the base panel of the display of FIG. 2.

Referring to FIG. 6, there is shown a magnified portion of both the cover panel 32 and the base panel 30 of FIG. 2. The display housing 26 has a plurality of (electric field generating elements) strips 60 and strips 62. Transparent strips 60 which are located on the cover panel 32 are placed on horizontal parallel lines. Strips 62 which are located on the base panel 30 are placed on horizontal parallel lines. Strips 62 can be either transparent or opaque.

Figure 7:
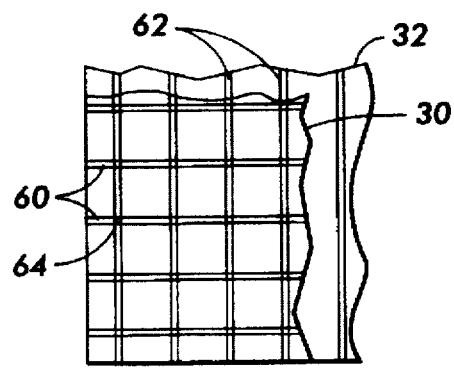
FIG. 7 shows a magnified top view of a portion of the display of FIG. 2 while the cover panel is in a locked position.

Referring to FIG. 7, there is shown a magnified top view of a portion of the display 24 of FIG. 2 while the cover panel 32 is in a locked position. Once the cover panel 32 is closed to a locked position, each one of the strips 60 of the cover panel 32 and each one of the strips 62 of the base panel 30 can be individually connected to a potential to be activated. When a given horizontal strip 60 of cover panel 32 and a given vertical strip 62 of base panel 30 are activated, at the crossing point 64 of the two given strips, an electric field is created. This method of creating electric fields is called passive matrix addressing.

It should be noted that the strips 60 and 62 do not touch each other since the strips 60 are on cover panel 32 and the strips 62 are on the base panel 30 and cover panel 32 is spaced from the base panel 30. However, where the strips 60 cross strips 62, they create an electric field.

Referring to Both FIGS. 2 and 7, if a display sheet is placed in the display housing 26 and the cover panel 32 is closed to a locked position, by activating two given strips 60 and 62, at the crossing point 64 of the two strips 60 and 62 an electric field across the display sheet 28 will be created. The created electric field activates an image producing element which is located in the path of the electric field. The strip 60 at the crossing point 64 acts as an electrode on the top of the display sheet and the strip 62 on the crossing point 64 acts as an electrode on the bottom of the display sheet. Therefore, the strips 60 and 62 at the crossing points 64 can be called electrodes.

With the arrangement of the strips 60 and 62, to create an electric field at a given location, the two strips 60 and 62 which cross at the given location will be activated. The number of the strips 60 and strips 62 are enough to create crossing points 64 for all the image producing elements of the display sheet 28. Therefore, for each given image producing element, there is a pair of electrodes which can be individually addressed to create an electric field.

By having the capability of individually addressing each electrode, selective electric fields can be created to activate selective image producing elements for producing a desired image. It should be noted that the processor of the computing system 20 of FIG. 2 is connected to the strips 60 and 62 of the display housing 26 for individually addressing the electrodes at the crossing points 64 and therefore creating desired image or text on the display sheet 28.

The number of the crossing points can be less than the total number of image producing elements of the display sheet 28. If the number of electric fields are less than the total number of image producing elements, then the width of strips 60 and 62 have to be designed to provide a larger area at each crossing point 64. A larger area at the crossing point creates a wider electric field which covers more than one image producing element and therefore activate more than one image producing element. However, it should be noted that the resolution is decreased as number of electric fields is decreased.

It should be noted that the strips 60 of the cover panel 32 can be placed vertically in which case the strips 62 of the base panel 30 have to be placed horizontally. Furthermore, it should be noted that the display housing disclosed in this invention is not limited to the use of strips for creating electric field. Any means (field activating elements) which can create electrical field to activate the image producing elements of a display sheet can replace the strips of the display housing of this invention.

Referring back to FIG. 2, in operation, once a removable display sheet 28 is placed on the base panel 26 and the cover panel 28 is closed to a locked position, the removable display sheet 28 performs as a display screen of the computing system 22. The processor properly selects and activates the strips 60 and 62 of the housing 26 in order to create an image on the display sheet 28.

In this invention, any image that can be displayed on a conventional display can be displayed on the display sheet 28 of this invention. Furthermore, every time the processor modifies the image or changes the image to a different image, the newly created image by the processor will be displayed on the display sheet 28.

Figure 8:
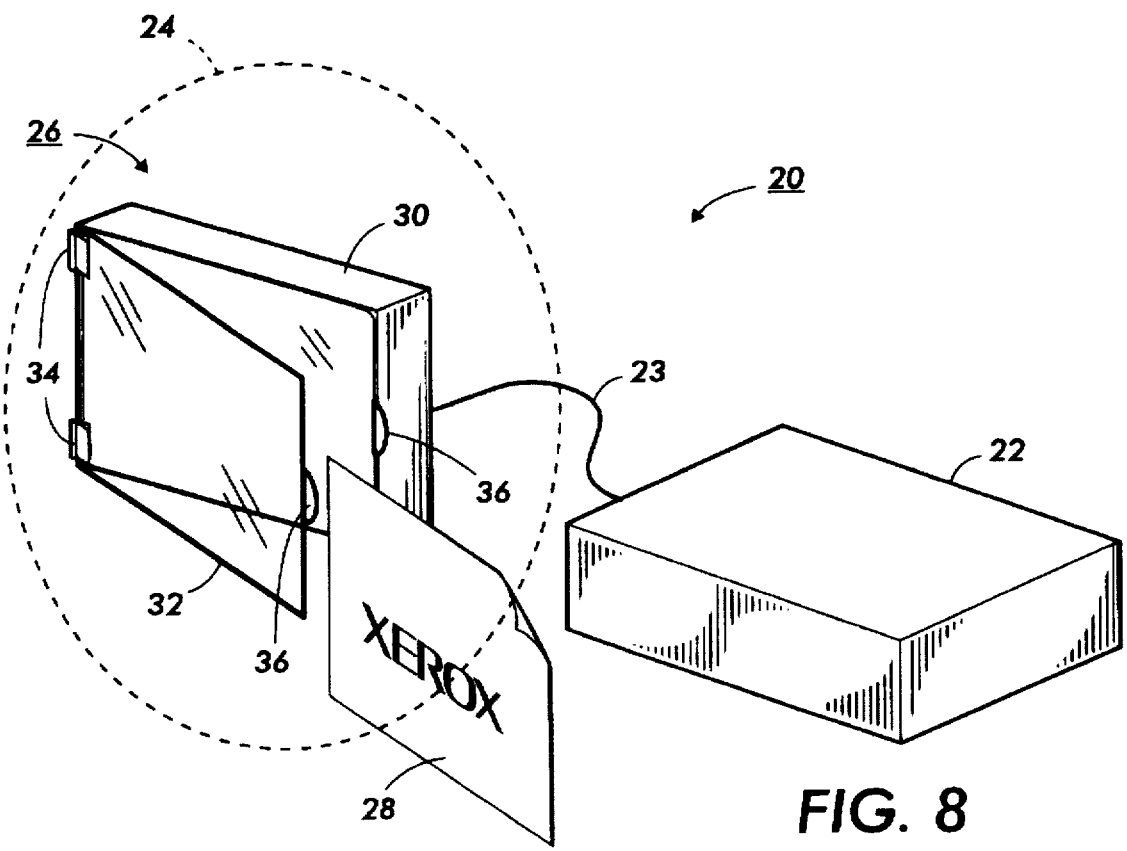
FIG. 8 shows the cover panel of the display of FIG. 2 is opened in order remove the display sheet to be used as a printed document.

Referring to FIG. 8, once an image or text is created on a display sheet 28, the cover panel 32 can be opened and the display sheet can be removed to be used as a printed document. It should be noted that once the display sheet is removed from the display housing, it will retain its current image and therefore the display sheet 28 can be used as a printed document. Typically, an operator of a computing system wishes to have a print out while he/she has stopped sending a command to the processor to change the image. Therefore, when the cover panel is being opened, the processor is not changing the image.

However, to prevent the accidental image change on the display sheet 28 upon removal from the display housing 26, the lock 36 on the display housing 26 can be designed to be controlled by software. The software can be programmed to unlock the lock 36 on the display housing 26 only when the processor is blocked from accessing the strips 60 and 62 of the display housing 26.

It should be noted that a removable display sheet that is being placed in the display housing 26 of this invention to be used as a display screen, can be blank or can have a displayed image. Once a removable display sheet 28, which has a displayed image, is placed in the display housing 26, the processor of the computing system will send new images to the field activating elements of the display housing to activate the image producing elements of the display sheet 28 according to the new images.

It should also be noted that the disclosed display of this invention can also be designed to work with display sheets that have colored image producing elements in order to display colored images or it can be designed to work with display sheets that have black and white image producing elements in order to display black and white images.

It should be noted that display 40 of the lap top system of FIG. 3 operates in the same manner as the display 24 of FIG. 2.

The interactive display of this invention, which performs both as a display and as a printer, eliminates the need for a separate printer and solves the portability problem of the laptop computing systems which require a separate printer. For example, if the display of this invention is used as a display of a laptop computing system, the user can produce prints by simply opening the cover panel and removing the display sheet to utilize it as one might use a paper. Furthermore, the interactive display of this invention provides more flexibility to the user. For example, the user can produce prints and if desired, each print can be placed back into the display to be modified. In order to modify a print, the display sheet has to be placed into a display connected to a processor which has the original content information.

Figure 9:
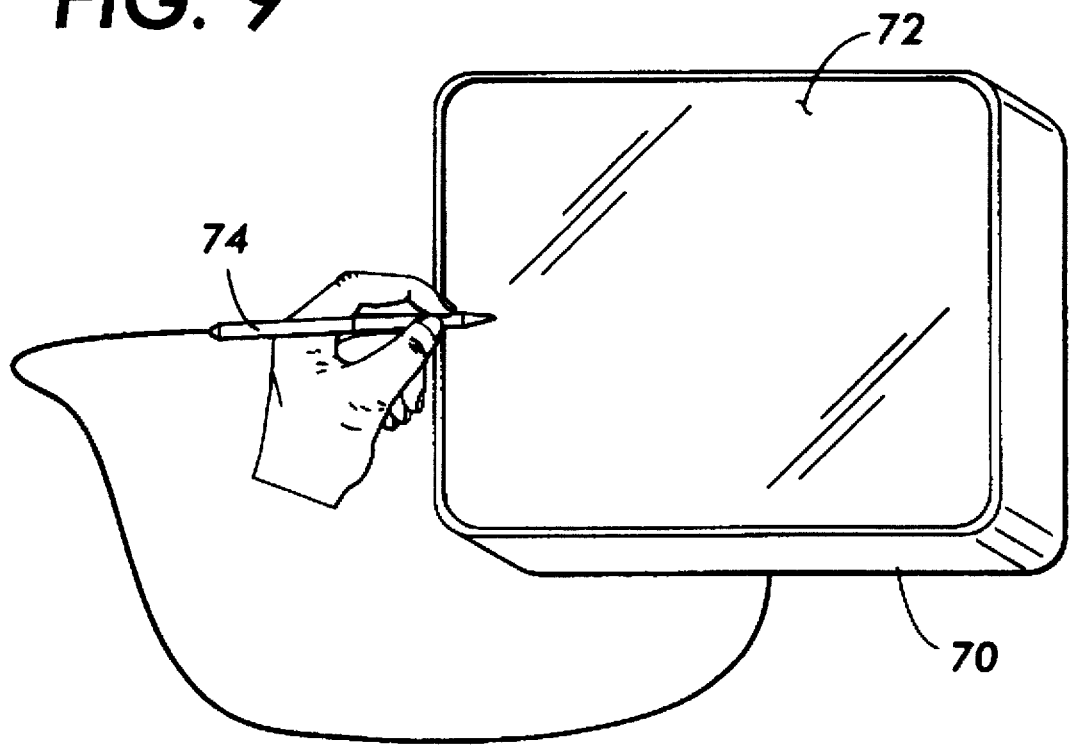
FIG. 9 shows a laptop computing system using the display of this invention in conjunction with an electric pen.

It should be noted that a user can send commands to the processor to change the displayed image through a medium such as a key board as shown in FIG. 3 or an electric pen as shown in FIG. 9. In FIG. 9, there is shown a laptop computing system 70 which has the display 72 of this invention. In FIG. 9, an electric pen 74 is utilized to send commands to the processor of the lap top. Furthermore, it should be noted that the use of a key board or an electric pen is not limited to the laptop computing systems; they can also be used in conjunction with a detached display of a personal computing system.

It should also be noted that by adding a scanner bar to the display of this invention, the display can also be used as a copier. The scanner bar can scan a sheet of paper or display sheet which is placed over the cover panel and send the scanned information to the processor. The processor in return will send the scanned information to the field activating elements of the display housing to activate the image producing elements of a display sheet which is placed inside the display housing to produce a copy of the scanned information.

The display of this invention can utilize a cut sheet of display sheet or a continuously fed sheet of display sheet which can be cut as needed.

It should further be noted that the disclosed embodiment of this invention is not limited to the induced field activated display sheets discussed in this specification. Any induced field activated display sheet which is capable of image generation and has physical integrity of a sheet can be utilized as a removable display sheet and the cover panel and the base panel of the display housing can be modified to provide the necessary elements to produce the induced fields required by the design of the induced field activated display sheet.

An important feature of the display of this invention is that when the removable display sheet 28 is placed in the display housing 26, it does not have to be placed at a precise position. This is due to the fact that the area covered by the electrodes (created by strips 62 and 64) is slightly larger than the area of the display sheet. As a result, the pixels corresponding to the electrodes that are outside of the boundary of the display sheet will not be viewed. Therefore, the pixel information provided by the electrodes is cut from each side. If the display sheet is not precisely aligned with its intended position, the image might be cut slightly more on one side of the display sheet than the other. However, in the preferred embodiment of this invention, the unused portion of the electrodes corresponds to 1 to 5 pixels. As a result, the portion of the image which is cut is insignificant to a viewer. In summary, even with a small misalignment, the sheet is always covered by electrodes and create an useable image for the viewer.

We claim:

1. A computing system comprising:

a processor;

a sole display for the computing system;

said display comprising a display housing and a removable induced field activated display sheet;

said display housing being so constructed and arranged to receive said removable induced field activated display sheet;

said induced field activated display sheet having a plurality of image producing elements responsive to an induced field;

said induced field activated display sheet being flexible;

said display housing having a plurality of induced field creating means each of which is arranged to activate at least a respective one of the image producing elements of the induced field activated display sheet when located in said display housing;

means operably connected to said processor and said display housing for selectively activating said plurality of induced field creating means to thereby selectively activate the image producing elements of said induced field activated display sheet when located in said display housing in order to create different image on said same induced field activated display sheet in response to different images generated by said processor; and said induced field activated display sheet being so constructed and arranged to retain its current image when removed from said display housing.

2. The computing system recited in claim 1, wherein said display housing comprises a base panel and a transparent cover.

3. The computing system recited in claim 2, wherein said plurality of induced field creating means include plurality of electrode means on said base panel.

4. The computing system recited in claim 2, wherein said plurality of induced field creating means include plurality of electrode means on said transparent cover.

5. The computing system recited in claim 2, wherein said plurality of induced field creating means include plurality of electrode means on said base panel and plurality of electrode means on said transparent cover.

6. The computing system recited in claim 4, wherein said plurality of electrode means on said transparent cover are transparent.

7. The computing system recited in claim 5, wherein plurality of electrode means on said transparent cover are transparent.

8. The computing system recited in claim 5, wherein said plurality of electrode means on said base panel are parallel to each other and said plurality of electrode means on said transparent cover are parallel to each other.

9. The computing system recited in claim 8, wherein each one of said plurality of electrode means on said base panel extends in a direction which is transverse to the direction of said plurality of electrode means on said transparent cover.

10. The computing system recited in claim 9, wherein said direction of each one of said plurality of electrode means on said base panel extends in a direction which is perpendicular to said direction of said plurality of electrode means on said transparent cover.

11. The computing system recited in claim 10, wherein said plurality of electrode means on said transparent cover are transparent.

* * * * *